L. CALLAHAN.
MATERIAL TRANSFERRING APPARATUS.
APPLICATION FILED JAN. 21, 1909.

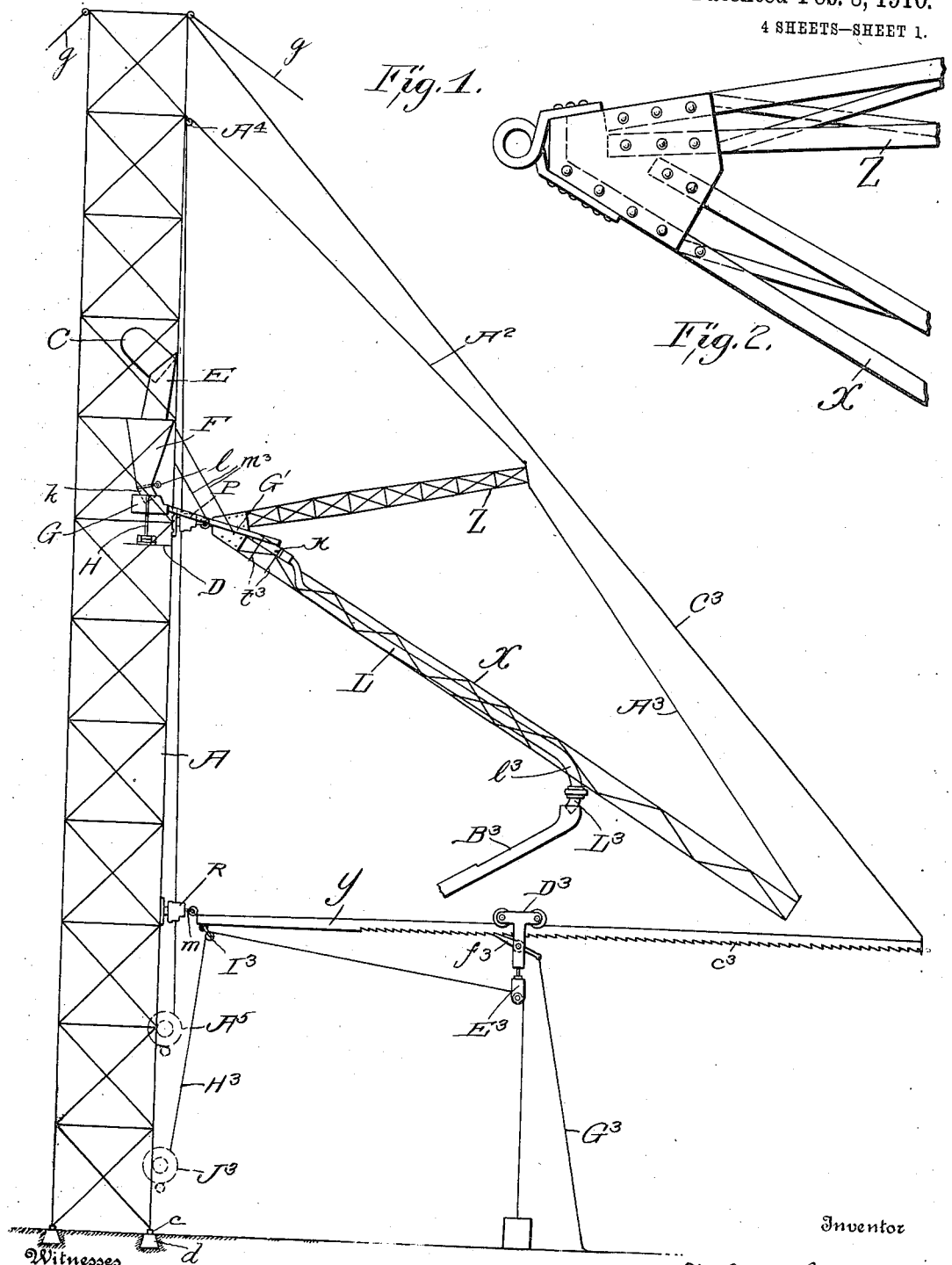

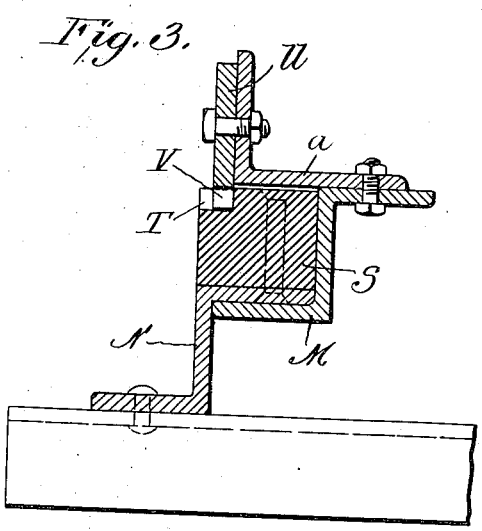
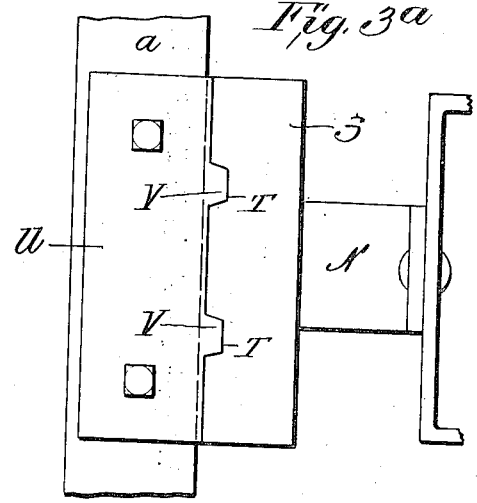
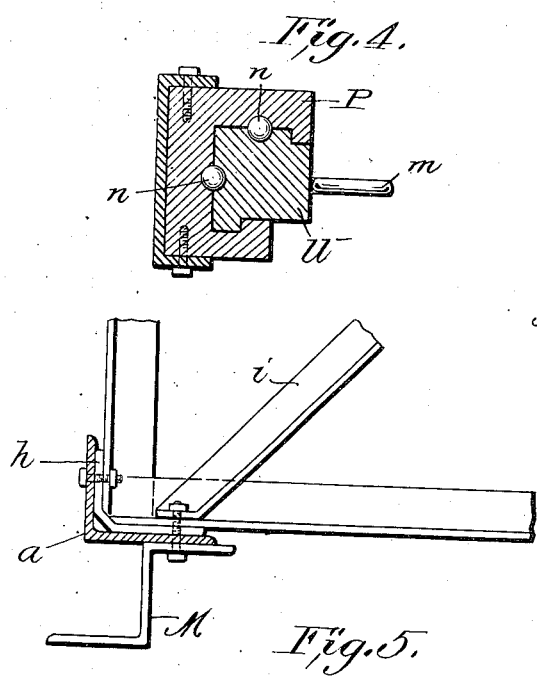
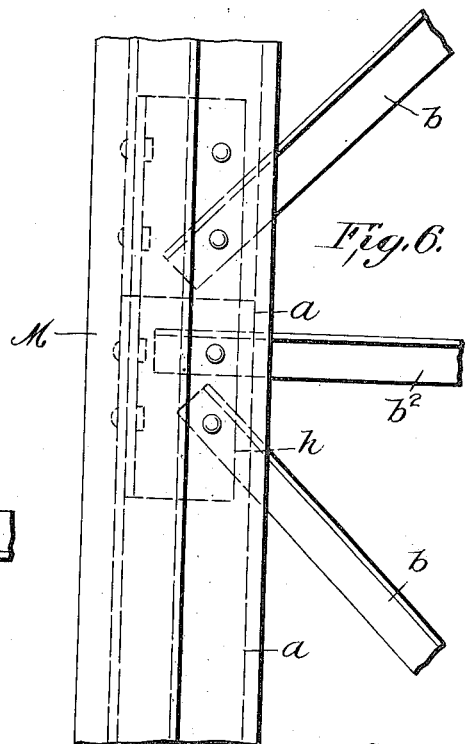

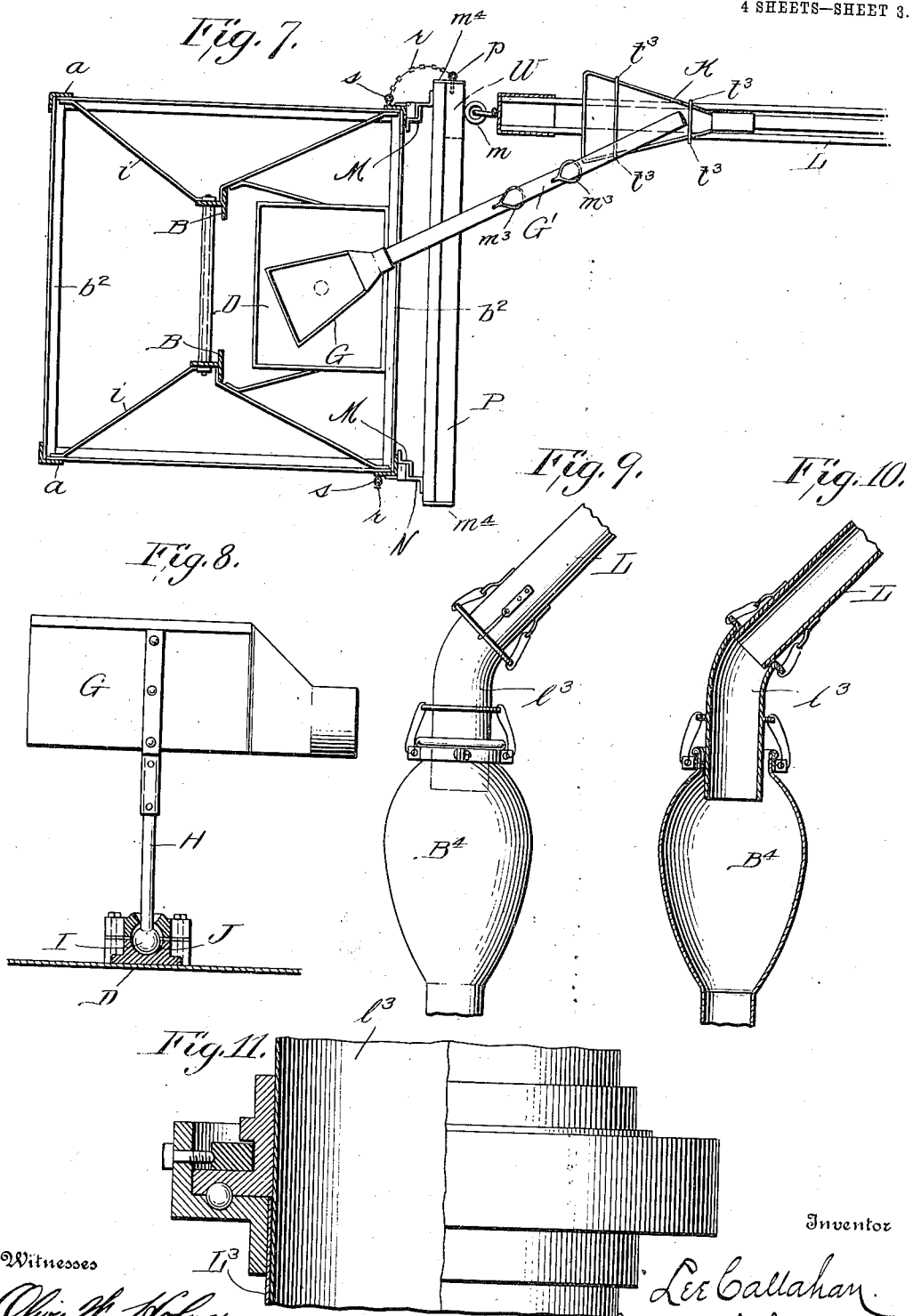

948,719.

Patented Feb. 8, 1910.

4 SHEETS—SHEET 4.

Witnesses
Oliver W. Holmes
W. C. Healy

Inventor
Lee Callahan
James J. Sheehy
By Attorney

UNITED STATES PATENT OFFICE.

LEE CALLAHAN, OF SAN DIEGO, CALIFORNIA, ASSIGNOR, BY MESNE ASSIGNMENTS, TO CONCRETE APPLIANCES COMPANY, OF ST. LOUIS, MISSOURI, A CORPORATION OF MISSOURI.

MATERIAL-TRANSFERRING APPARATUS.

948,719.   Specification of Letters Patent.   Patented Feb. 8, 1910.

Application filed January 21, 1909. Serial No. 473,461.

*To all whom it may concern:*

Be it known that I, LEE CALLAHAN, a citizen of the United States, residing at San Diego, in the county of San Diego and State of California, have invented new and useful Improvements in Material-Transferring Apparatus, of which the following is a specification.

My invention pertains to apparatus for supplying materials to buildings in the course of erection; and it has for its general object to provide an apparatus calculated to be used to advantage in transferring concrete or other plastic material from a suitable source of supply to the points desired on a building that is being built.

Another general object of the invention is to provide an apparatus of the kind stated adapted more especially for use when a building is to embody reinforced concrete, and provided with means for transferring plastic material, and also with means for transferring other material from the ground to the points desired on a building in course of construction.

Figure 12:
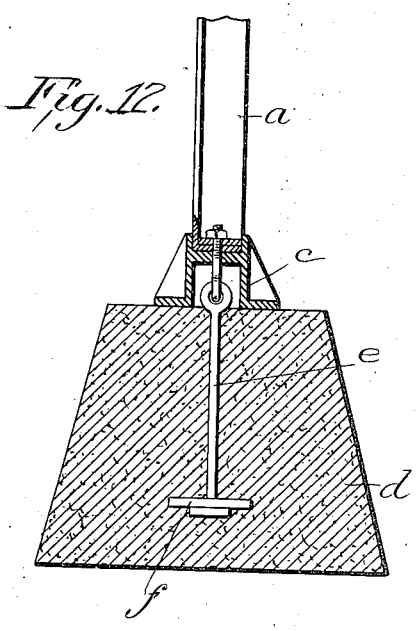
Figure 13:
Figure 14:
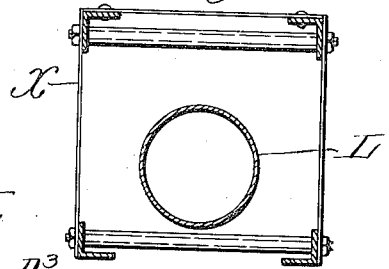
Figure 15:
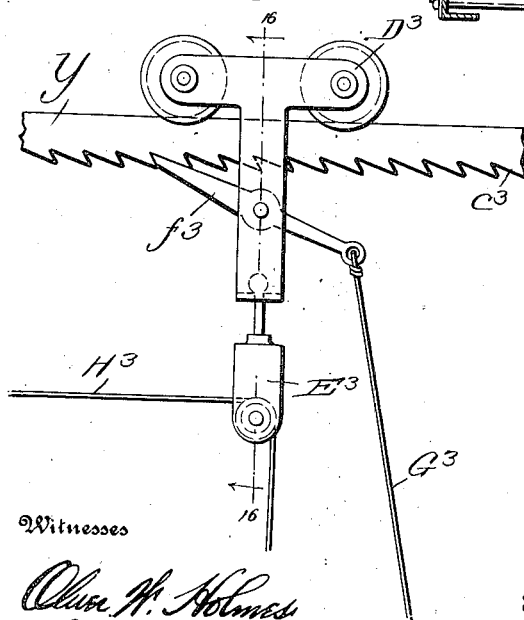
Figure 16:
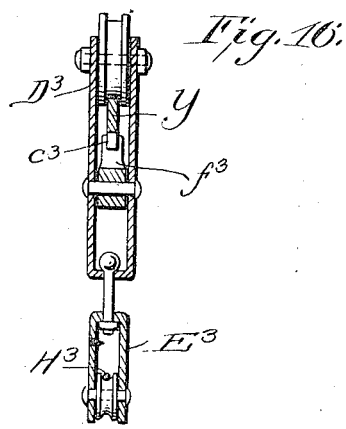

With the foregoing in view, the invention will be fully understood from the following description and claims when the same are read in connection with the drawings, accompanying and forming part of this specification, in which:

Figure 1 is a side elevation of the apparatus constituting the best practical embodiment of my invention of which I am cognizant. Fig. 2 is an enlarged detail view of the plastic-material boom with the conduit omitted. Figs. 3 and 3ª are enlarged detail views showing the manner in which the horizontal tracks are adjustably fixed at different points in the height of the tower. Fig. 4 is a cross-section showing one track and the arrangement of one boom-carriage therein. Fig. 5 is a detail horizontal section, and Fig. 6, a detail elevation of a part of the tower. Fig. 7 is an enlarged horizontal section of the tower. Fig. 8 is an enlarged detail view, partly in section and partly in elevation, showing one of the open pans of the apparatus and the support thereof. Figs. 9, 10 and 11 are enlarged detail views illustrative of conduit connections hereinafter referred to. Figs. 12 and 13 are enlarged detail views showing the manner in which I prefer to fasten the lower ends of the corner uprights of the tower. Fig. 14 is a detail cross-section showing the arrangement of the conduit in the plastic-material boom. Fig. 15 is an enlarged detail elevation of the carriage or traveler on the construction boom. Fig. 16 is a transverse section taken in the plane indicated by the line 16—16 of Fig. 15.

Similar letters designate corresponding parts in all of the views of the drawings, referring to which:

A is the fixed tower of my novel apparatus. The said tower may be of any general construction consonant with the purpose of my invention without involving departure from the same as claimed. I prefer, however, to construct the tower of suitable metal, and in twelve-foot, superposed sections, and to have it comprise corner uprights $a$, of angular form in cross-section, and inclined braces $b$ and horizontal braces $b^2$, of similar form in cross-section, connecting the corner uprights in such manner as to make the tower of rectangular form in cross-section. I also prefer to fix the tower in position in the manner illustrated in Figs. 1, 12 and 13—that is to say, by arranging the corner uprights $a$ of the lowermost section in seats $c$ arranged on concrete bases $d$, embedded in the ground, and by connecting the lower ends of said uprights and the seats $c$ through the medium of bolts $e$ with anchors $f$ held in the bases $d$. It will also be understood in this connection that guy cables $g$, Fig. 1, extending from the upper end of the tower to fixed objects located about the tower, may be and preferably are employed to assist in maintaining the tower in upright position.

The tower is increased in height as the construction of a building progresses by adding twelve-foot sections, and each added section is fixedly connected with the one below it, preferably through the medium of fish-plates $h$ best shown in Figs. 5 and 6.

Arranged in the tower A and connected by struts $i$ with the corner uprights $a$ thereof, are upright rails B, Fig. 7, and at this point I would have it understood that when a section is added to the tower to increase the height thereof, sections will be added to the rails B to correspondingly increase the height of the same. The rails B are designed to coöperate with and guide a skip C, the office of which is to hoist plastic material to a desired point in the height of the tower and there dump the same. The skip C and the means for raising and tripping the same are preferably, though not necessarily, of the type disclosed in the Letters-Patent of one Wallace, No. 830,385 of September 4, 1906, and I have therefore deemed it sufficient to show the skip alone diagrammatically herein. I would also have it understood that when desired the skip may be dumped by a man stationed on the tower at the point where the skip is to be discharged of its contents, without affecting my invention.

Removably arranged in the tower and suitably supported, preferably by resting on one of the horizontal braces and by being hung from struts $i$, is a floor or platform D, and suitably supported above said platform D is a chute E adapted to receive plastic material from the skip C, and a hopper F arranged to receive plastic material from the chute, which hopper F is provided with a contracted discharge $k$ and a gate $l$ through the medium of which the before mentioned attendant can control the passage of plastic material from the hopper F. Arranged below and adapted to receive plastic material from the discharge of the hopper F is an open pan G to which is fixed a support H, Figs. 1 and 8. The said support H terminates at its lower end in a ball I which is disposed in a complementary socket J on on the floor or platform D, and hence it will be manifest that the contracted discharge pipe G' slipped in or on the reduced end of the pan G may be pointed in various directions according to the points on the building at which the plastic material is to be delivered to forms, as hereinafter described in detail. The said pipe G', which extends outside the tower A and is preferably supported by wires $m^3$, Figs. 1 and 7, or other suitable means, is positioned to supply plastic material to an open pan K suitably connected with a conduit L, hereinafter described.

Fixed to the tower A at points adjacent the two forward corners thereof and extending throughout the height of the tower are Z-bars M, Figs. 3 and 7, so termed because of their shape in horizontal section. These bars M are designed for the engagement of Z-shaped hooks N on horizontal, vertically adjustable tracks P and R which are arranged one above the other and extend across the front side of the tower. Each track is adjustably fixed to the tower and against gravitation by the means best shown in Figs. 3, 3ª and 7—that is to say, through the medium of cast iron blocks S riveted to its hooks N and having notches T, and locking pieces U detachably connected to the corner uprights $a$ of the tower, and having lugs V which occupy the said notches T. From this it follows that each track may be fixed to the tower at various points in the height thereof, and in this connection I would have it understood that any suitable means may be employed to raise and lower either track P or R such, for instance, as a cable (not shown) connected to the track and passed through a pulley block (also not shown) fastened at or near the top of the tower. Each of the tracks P and R is equipped with a boom-carriage W, best shown in Fig. 4, having an eye $m$, and anti-friction balls $n$ for easing the movement of the carriage, and each boom-carriage is provided with end sockets to receive eye-bolts $p$, connected by chains $r$ with eye-bolts $s$ which, in turn, are connected to opposite sides of the tower, this with a view of retaining the boom-carriage at one end or the other of its respective track. It will be understood here that each track has end plates $m^4$ or other stops to limit movement of its boom-carriage and that the eye-bolts $p$ are turned through openings in said end plates $m^4$ and into the threaded sockets in their respective carriage.

X is the plastic-material boom of the apparatus—i. e., the boom which carries conduit L, and Y is the construction-boom—i. e., the boom having to do with the placing of forms, reinforcing-metal work, etc. on the building that is being constructed; the boom X being connected with the eye $m$ of carriage W in the track P, and the boom Y being connected with the eye $m$ of the carriage W in the track R. The boom X is preferably shaped in cross-section as shown in Fig. 14 and is designed to extend downwardly from the tower at about the angle shown in Fig. 1. Fixed to the inner end of the boom X, preferably in the manner shown in Fig. 2, and extending at an acute angle to said boom X, is an arm Z to which are connected cables $A^2$ $A^3$ through which the boom is maintained in position and moved as occasion demands; the cable $A^2$ being carried over a sheave $A^4$, and thence down to any suitable power or manual means $A^5$ for taking up or paying out the cable $A^2$.

As will be readily appreciated, the described arrangement of the arm Z, relative to the boom X, is materially advantageous inasmuch as it affords considerable leverage in the maintainence of the boom X in the position shown and in the raising and lowering of said boom.

The conduit L which extends through the boom X, Fig. 14, may be and preferably is formed in sections detachably connected by wires in the manner shown at the top of Fig. 9 or in any other approved manner, and obviously said conduit may be of any desired length to extend to any point in the length of the boom or beyond the outer end of the boom. The outermost section $l^3$ of the conduit L is made to depend from the boom and is connected in the swiveled manner shown in Figs. 1 and 11, with a pipe section $L^3$ which latter is designed to discharge into a pipe $B^3$ for conveying the plastic material to a form or the like; the said pipe $B^3$ being open for a portion of its length, as shown, so as to enable an attendant to readily clear it when necessary and in that way prevent choking of the conduit L.

When deemed expedient or desirable, the pipe section $B^4$ of Figs. 9 and 10 may be used in lieu of the pipe sections $L^3$ and $B^3$; the said section $B^4$ being connected in a swiveled manner to the outermost section $l^3$ of conduit L, and being of a greater size in cross-section for a portion of its length than the same, this latter in order to lessen the liability of the conduit L becoming choked.

The before described pan K is arranged on and connected by wires $t^3$ or other suitable means to the boom L in position to receive from the pipe G', and the reduced end of said pan K is suitably connected with and arranged to discharge into the conduit L, Fig. 7.

The construction boom Y is maintained in the position shown by a guy cable $C^3$ extending between its outer end and the tower A, and is toothed at its underside, as indicated by $c^3$. On said boom Y is arranged a traveler $D^3$ which carries a pulley block $E^3$ and a dog lever $F^3$, the latter having a comparatively heavy arm $f^3$ adapted to engage the teeth $c^3$ and also having its other arm connected to a cable $G^3$ which extends to the ground. It will be manifest from the foregoing that an attendant standing on the ground is enabled through the cable $G^3$ to move the traveler $D^3$ outwardly on the boom Y; also, that when the cable $G^3$ is relieved of pull the arm $f^3$ of lever $F^3$ will fall away from the teeth of the boom, this latter in order to permit of the traveler being drawn inwardly on the boom after a load has been raised through the medium of a cable $H^3$ which extends through the pulley block $E^3$ and another pulley block $I^3$ and is designed to be taken up and paid out by suitable power or hand means $J^3$.

It will be gathered from the foregoing that when the carriages of the booms X and Y are held at one corner of the tower the booms can be oscillated to encircle three-fourths of a building, and then by shifting the boom carriages to the other corner of the tower and there fastening the same, the booms may be moved to reach to the other one-fourth of the building. It will also be manifest that as a building is raised the booms and the appurtenances can be raised, and when the apparatus is in use the only manual labor necessary to the successful operation thereof is one man on the platform D, one man to manipulate the lines of the booms, and three men to supply and set materials and tamp walls, etc.

As before stated, the construction herein shown and described constitutes the best practical embodiment of my invention of which I am aware, but it is obvious that in the future practice of my invention various changes in the form, construction and relative arrangement of parts may be made within the scope of my invention as defined in the claims appended.

Having described my invention, what I claim and desire to secure by Letters-Patent, is:

1. An apparatus for the purpose described, comprising a tower, a suitably-supported horizontally movable boom connected therewith, a conduit carried by the boom, means for raising plastic material to a suitable point in the height of the tower, and means for receiving plastic material from said raising means and conducting the same to said conduit.

2. An apparatus for the purpose described, comprising a tower, a suitably-supported oscillatory boom connected therewith, a conduit carried by the boom, means for raising plastic material to a suitable point in the height of the tower, and means for receiving plastic material from said raising means and conducting the same to said conduit.

3. An apparatus for the purpose described comprising a tower, a boom connected at its inner end with the tower and having an arm fixed with respect to and extending upwardly and outwardly at an acute angle from its inner portion; said boom and its arm being movable together as one piece, and means connecting the outer portion of the arm and the portion of the tower above the boom.

4. An apparatus for the purpose described comprising a tower, a boom connected at its inner end with the tower and having an arm extending upwardly and outwardly at an acute angle from its inner portion, means connecting the outer portion of the arm and the portion of the tower above the boom, a conduit carried by the boom, means for raising plastic material to a suitable point in the height of the tower, and means for receiving plastic material from said raising means and conducting the same to said conduit.

5. An apparatus for the purpose described, comprising a tower, a conduit extending laterally therefrom, a suitably-supported, horizontally-movable boom carrying the conduit; said boom being adjustably connected with the tower and adapted to be arranged at various points in the height thereof, means for raising plastic material to the point desired in the height of the conduit, and means for receiving plastic material from the raising means and conducting same to the conduit; the said receiving and conducting means being adjustable in the direction of the height of the tower.

6. An apparatus for the purpose described, comprising a tower, a track thereon, a carriage movable on the track and across the tower, a suitably supported boom connected with said carriage, a conduit carried by said boom, means for raising plastic material to a desired point in the height of the tower, and means for receiving plastic material from the raising means and conducting said material to the conduit.

7. An apparatus for the purpose described, comprising a tower, a track connected with and extending across the tower, a carriage on the track, and a suitably supported boom connected and movable with the carriage.

8. An apparatus for the purpose described, comprising a tower, a track connected with and extending across the tower, a carriage on the track, a suitably supported boom connected and movable with the carriage, and means for detachably fastening the carriage at opposite ends of the track.

9. In an apparatus for the purpose described, the combination of a tower having upright bars of angular form in cross-section, a track resting in front of the bars and having angular hooks engaged with and movable vertically on the bars and also having means on the hooks adapted to coöperate with means on the tower for adjustably fixing the hooks in position, the said means on the tower, and a carriage on the track.

10. In an apparatus for the purpose described, the combination of a tower having upright bars of angular form in cross-section, a track resting in front of the bars and having angular hooks engaged with and movable vertically on the bars and also having notched blocks on the hooks, movable means on the tower adapted to coöperate with said blocks, and a carriage on the track.

11. In an apparatus for the purpose described, the combination of a tower, means for raising plastic material to a suitable height thereof, tracks arranged one above the other on the tower and adapted to be moved, a carriage movable on one track, a construction boom connected with said carriage, a carriage movable on the other track, a boom connected with the latter carriage, a conduit carried by said means, and means for receiving plastic material from the raising means and conducting the same to the conduit of the boom.

12. The combination of a boom toothed at its underside, a traveler arranged on the boom and depending therefrom, a lever dog carried by the depending portion of the traveler and having a comparatively heavy arm adapted to engage the teeth of the boom, and depending means connected with the other arm of the lever dog.

13. In an apparatus for the purpose set forth, the combination of a tower, a boom connected therewith, a conduit carried by the boom, means for raising plastic material to a suitable point in the height of the tower and above the inner end of the conduit, and means for receiving plastic material from said raising means and chuting the same to the conduit.

14. In an apparatus for the purpose set forth, the combination of a tower, a boom connected therewith, a conduit carried by the boom, means for raising plastic material to a suitable point in the height of the tower and above the inner end of the conduit, and means for receiving plastic material from said raising means and chuting the same to the conduit; said means comprising a pan and a movable support therefor.

15. In an apparatus for the purpose set forth, the combination of a tower, a boom connected therewith, a conduit carried by the boom, means for raising plastic material to a suitable point in the height of the tower and above the inner end of the conduit, and means for receiving plastic material from said raising means and chuting the same to the conduit; said means comprising a pan movably supported in the tower, a conduit connected therewith, and a pan on the boom and connected with the conduit carried thereby and arranged to receive material from the conduit on the first named pan.

16. An apparatus for the purpose described comprising a tower, a boom connected at its inner end with the tower and having an arm fixed with respect to and extending upwardly and downwardly at an acute angle from its inner portion; said boom and its arm being movable together as one piece, means connecting the outer portion of the arm and the portion of the tower above the boom, means on the tower for elevating plastic material to a point above the plane of the work to be performed, a hopper adapted to receive the material so elevated and mounted on the tower, and a distributing conduit carried by and revoluble with the boom and arranged beneath and adapted to receive material from the hopper.

In testimony whereof I have hereunto set my hand in presence of two subscribing witnesses.

LEE CALLAHAN.

Witnesses:
W. I. WARNER,
W. E. BARTLETT.